US008672053B2

(12) United States Patent
Hahn

(10) Patent No.: US 8,672,053 B2
(45) Date of Patent: Mar. 18, 2014

(54) TOOL HOLDER FOR IMPACTING MACHINE

(75) Inventor: Norbert Hahn, Hünstetten-Limbach (DE)

(73) Assignee: Black & Decker Inc., Newark, DE (US)

( * ) Notice: Subject to any disclaimer, the term of this patent is extended or adjusted under 35 U.S.C. 154(b) by 2228 days.

(21) Appl. No.: 10/688,261

(22) Filed: Oct. 17, 2003

(65) Prior Publication Data

US 2004/0084854 A1 May 6, 2004

(30) Foreign Application Priority Data

Oct. 18, 2002 (GB) .................................. 0224226.1

(51) Int. Cl.
*B23B 45/14* (2006.01)

(52) U.S. Cl.
USPC ............................................ 173/132; 173/90

(58) Field of Classification Search
USPC ........ 279/19.4, 2.01, 2.24, 23.1, 24, 35, 43.8, 279/46.1, 46.8, 60, 62, 65, 66, 106, 108, 279/109; 408/239 R; 173/90, 132
See application file for complete search history.

(56) References Cited

U.S. PATENT DOCUMENTS

| | | | | | |
|---|---|---|---|---|---|
| 1,467,604 | A | * | 9/1923 | Bowen et al. | 294/86.29 |
| 1,766,511 | A | | 6/1930 | Gustafson | |
| 1,800,345 | A | * | 4/1931 | Gustafson | 279/19.4 |
| 2,684,839 | A | | 7/1954 | Rice | |
| 3,525,531 | A | | 8/1970 | Ekstrom et al. | |
| 3,599,996 | A | * | 8/1971 | Holt | 279/37 |
| 4,032,163 | A | * | 6/1977 | Holt | 279/37 |
| 4,064,949 | A | * | 12/1977 | Chromy | 173/14 |
| 4,113,035 | A | * | 9/1978 | Stiltz et al. | 173/201 |
| 4,113,165 | A | * | 9/1978 | Ott | 228/36 |
| 4,231,581 | A | | 11/1980 | Benedict | |
| 4,491,444 | A | * | 1/1985 | Rumpp et al. | 409/234 |
| 4,553,886 | A | * | 11/1985 | Vasilchenko et al. | 409/233 |
| 4,830,549 | A | * | 5/1989 | Neumaier et al. | 408/9 |
| 5,180,259 | A | * | 1/1993 | Voellmer | 408/124 |
| 5,403,132 | A | * | 4/1995 | Truesdell | 409/131 |
| 5,601,388 | A | | 2/1997 | Lauterwald | |
| 5,630,818 | A | * | 5/1997 | Del Rio et al. | 606/80 |
| 5,820,136 | A | * | 10/1998 | Han et al. | 279/131 |

(Continued)

FOREIGN PATENT DOCUMENTS

| | | | |
|---|---|---|---|
| DE | 886434 | A | 8/1953 |
| FR | 2320812 | A | 3/1977 |
| GB | 1244370 | A | 9/1971 |
| SU | 914758 | A | 3/1982 |

*Primary Examiner* — Hemant M Desai
*Assistant Examiner* — Gloria R Weeks
(74) *Attorney, Agent, or Firm* — Kofi Schulterbrandt; Scott B. Markow; Adan Ayala

(57) ABSTRACT

A tool holder for a hand supported impacting machine, which tool holder is suitable for receiving a tool having a shank portion on which is formed a retaining collar. The tool holder includes a tubular main body for receiving the tool and at least one locking element moveably mounted with respect to the main body and having an engaging portion moveable between a radially inner locked position in which the engaging portion is engageable with the retaining collar of the tool and a radially outer unlocked position in which a tool can be inserted into or removed from the tool holder. The tool holder additionally comprises a manually actuable sleeve moveable between a locked position in which the locking elements are held in their locked position and an unlocked position in which the engaging portions of the locking elements are moveable to their unlocked position.

23 Claims, 3 Drawing Sheets

(56) References Cited

U.S. PATENT DOCUMENTS

| | | | | |
|---|---|---|---|---|
| 5,921,563 | A * | 7/1999 | Huggins et al. | 279/131 |
| 6,135,461 | A | 10/2000 | Below et al. | |
| 6,241,026 | B1 * | 6/2001 | Wache et al. | 173/132 |
| 6,659,473 | B2 * | 12/2003 | Below et al. | 279/19.4 |
| 7,264,429 | B2 * | 9/2007 | Miller | 409/182 |

* cited by examiner locked
unlocked

TOOL HOLDER FOR IMPACTING MACHINE

This invention relates a hand supported impacting machine, such as a concrete breaker or a heavy duty demolition hammer.

BACKGROUND OF THE INVENTION

Impacting machines of this type generally have a tool holder in which a tool can be releasably fitted for limited axial reciprocation with respect to the tool holder. A hammering mechanism generates repeated impacts on the rearward end of the tool. The forward end of the tool is urged against a material to be broken up, such as rock or concrete and the tool transfers the impacts from the hammering mechanism to the material. The tool is generally held within the tool holder by a locking member which engages a retaining collar formed on the tool.

GB1,382,019, describes an impacting machine with a tool holder for a tool with such a retaining collar. In a first embodiment a latch is pivotally mounted on the tool holder, to pivot between a first position in which a projection on the latch is engageable with the collar to maintain the tool within the tool holder and a second position in which the projection is moved out of the path of the collar. The latch is releasably locked in the first position by the latch snap fitting between a pair of lugs, which lugs are made out of a resilient material. With the latch in the second position the tool can be removed from the tool holder and replaced by another tool. In a second embodiment a latch is slideably mounted within the tool holder between a first position in which a projection on the latch is engageable with the collar to maintain the tool within the tool holder and a second position in which the projection is moved out of the path of the collar. The latch is maintained in the first position by the snap fitting of a resilient collar within an annular recess formed on the latch. Both the embodiments require a user to use his or her feet to move the latch from the first position to the second position. Therefore, it is difficult to operate the latch of known tool holder designs for impacting machines which are fitted with tools having a collar.

BRIEF DESCRIPTION OF THE INVENTION

The aim of the present invention is to provide a more user friendly and ergonomic tool holder arrangement for a hand supported impacting machine in which tools with a retaining collar can be fitted.

According to the present invention there is provided a tool holder for a hand supported impacting machine, which tool holder is suitable for receiving a tool having a shank portion on which is formed a retaining collar via which retaining collar a tool is retained within the tool holder, the tool holder comprising:

a tubular main body for receiving the tool, and at least one, locking element moveably mounted with respect to the main body with the or each locking element having an engaging portion moveable between a radially inner locked position in which the engaging portion is engageable with a retaining collar of a tool to retain a tool within the main body and a radially outer unlocked position which enables a tool to be inserted into or removed from the main body;

characterised in that the tool holder additionally comprises a manually actuable sleeve which is mounted around the main body so as to be moveable between a locked position in which the engaging portions of the locking elements are held in their locked position and an unlocked position in which the engaging portions of the locking elements are moveable to their unlocked position by engagement with a retaining collar of a tool inserted in the main body.

Thus, the locking element or elements are moved between a position in which they lock the tool within the tool holder by engagement with a collar on a tool mounted within the main body of the tool holder and a position in which a collar on a tool can be moved axially past the locking element or elements by a simple movement of a sleeve by the hand of a user. Due to the manually actuable sleeve being a separate part from the locking element or elements, the ease of movement of the sleeve is not dictated by the forces which have to be withstood by the locking element. For the locking element or elements to remain in their locked position, the manually actuable sleeve need only be able to stay in its locked position despite the vibration of the impacting machine. Accordingly, a more user friendly and ergonomic tool holder is provided with respect to which a tool is easily fitted or removed by a user.

A retaining ring may be axially slideably mounted with respect to the main body and may be axially biased by a spring member into engagement with the locking element or elements so as to bias the or each locking element into the locked position. For example, the retaining ring may be located rearwardly of the locking elements and the spring member may axially bias the retaining ring in the forwards direction. To facilitate easy fitment of a tool within the tool holder and easy removal of a tool from the tool holder the axial movement of the retaining ring may be independent of the movement of the manually actuable sleeve.

In one embodiment of the present invention the or each locking element is axially elongated and is pivotally mounted on the main body so as to enable the engaging portion of the or each locking element to move radially with respect to the main body between the locked and unlocked positions. The pivotal mounting of the locking elements may be achieved by providing on the or each locking element a radially inwardly projecting portion engageable with a corresponding recess on the main body. In addition, the or each locking element may be formed with a radially inwardly facing recess adjacent the projecting portion, which recess is engageable with a corresponding projection on the main body so as to facilitate pivoting of the or each locking element. To achieve a movement of the engaging portion of the or each locking element sufficient to move them between their locked and unlocked position with minimum movement of the locking body, the rearward portion of the or each locking element may be pivotally mounted on the main body and the engaging portion may be located on a forward portion of the or each locking element.

A locking member, for example a locking ring, may be mounted or formed within the manually actuable sleeve and in the locked position of the sleeve the locking member may engage a radially outward portion of the or each locking element to hold the engaging portion of the or each locking element in their locked position. Then, in the unlocked position of the manually actuable sleeve the locking member may be located radially outwardly of a reduced external diameter portion of the or each locking element so as to provide a space radially outwardly of the locking element into which the locking element can pivot. Alternatively, in the unlocked position of the manually actuable sleeve the locking member may be located axially forwardly or rearwardly of the or each locking element so that it no longer prevents radially outward movement of the engaging portions of the or each locking element.

To further facilitate pivoting of the locking elements the or each locking element may be pivotally mounted on the main body about a first end and the retaining ring may be formed with a recess within which the first end of the or each locking element is received so as to guide the pivoting of the or each locking element.

There may be at least two locking elements and for a robust tool holder configuration which provides a good distribution of the impact forces transferred between the retaining collar of the tool and the locking elements, the locking elements in the locked position together form a sleeve which surrounds a tool inserted within the main body. In a particularly innovative embodiment of the present invention having the latter feature a forward end of the or each locking element extends forwardly of the forward end of the main body. Thus in the locked position, the locking elements form a sleeve which is a forwardly extending continuation of the main body of the tool holder. In this case, the or each locking element may be pivotally mounted at a rearward portion of the locking element on the main body and the or each locking element may have an engaging portion on a forward portion of the locking element. Also, a resilient ring portion may be mounted at a forward end of each locking element so that in the locked position of the engaging surfaces of the locking elements the ring portions together form a resilient nose ring. The resilient nose ring provides protection against damage for the forwardly extending continuation of the main body formed by the locking elements.

In an alternative embodiment with pivoting locking elements, the or each locking element may have a radially inwardly extending engaging portion which extends through an associated through hole formed in the wall of the main body. To facilitate easy fitment of a tool within the tool holder, without actuation of the manually actuable sleeve, the through hole may be axially longer than the engaging portion so as to enable the or each locking element to be slideably mounted with respect to the main body. For example, the retaining ring may be axially slideably mounted around the main body rearward of the locking element or elements and may be forwardly axially biased by a spring member into engagement with the locking element or elements so as to bias the or each locking element into the locked position and the or each locking element may be axially slideably mounted on the main body against the biasing force from the retaining ring. A locking member may be mounted or formed within the manually actuable sleeve and in the locked position of the sleeve the locking member may engage a radially outward portion of the or each locking element to hold the engaging surfaces of the or each locking element in their locked position and a collar of a tool inserted into the main body may be arranged to be engageable with the or each locking element in order to slide the locking element rearwardly with respect to the locking member against the retaining ring to a position in which the engaging portion of the or each locking element is moveable to its unlocked position. For example, the locking element may slide rearwardly to a position rearward of the locking member in which the engaging portion of the or each locking element is moveable to its unlocked position. For smooth axial guiding of the or each locking element, the or each locking element may be pivotally mounted at its rearward end within an annular recess formed on the main body and one or more slots may be formed on the main body with the or each slot circumferentially aligned a with corresponding locking element, which slot is a rearward extension of the annular recess and along which slot the corresponding locking element can be slideably guided.

According to a further embodiment of the present invention a retaining ring may be axially slideably mounted with respect to the main body to a first forward or rearward side of the locking element or elements and an actuator ring may be axially slideably mounted with respect to the main body to a second opposite side of the locking element or elements and the or each locking element may be arranged to be radially shiftable between the retaining ring and the actuator ring so as to be able to move the engaging portions of the or each locking elements between the locked and unlocked position. An actuator body mounted on the manually actuable sleeve may be engageable with the actuator ring so as to move the manually actuable sleeve from its locked to its unlocked position so as to move a sub-assembly comprising the actuator ring, the retaining sleeve and the or each locking element between a first axial position in which the engaging portion of the or each locking element is held in its locked position and a second axial position in which the engaging portion of the or each locking element is free to move to its unlocked position.

According to this further embodiment, the retaining ring the or each locking element and the actuator ring may form a sub-assembly which is axially slideably mounted within the main body. In this case, when the sub-assembly is in the first axial position a reduced internal diameter portion of the main body may be located radially outwardly of and so as to engage the or each locking element to hold the engaging portion of the or each locking element in its locked position and when the sub-assembly is in the second axial position an increased internal diameter portion of the main body may be located radially outwardly of the or each locking element so as to enable the engaging portions of the or each locking element to move radially outwardly into the unlocked position. Also, the main body may be formed in its wall with at least one hole through which an associated actuator body mounted on the manually actuable sleeve extends so as to engage the actuator ring. This enables the actuator body on the manually actuable sleeve which is mounted around the main body to extend into the main body to engage the actuator ring which is mounted within the main body.

The further embodiment of the tool holder may be arranged so that on insertion of a tool within the main body a retaining collar of a tool engages the or each locking element to move the or each locking element from the first to the second axial position against the biasing force if the retaining ring so as to enable fitment of the tool within the tool holder.

The present invention also provides a hand supported impacting machine comprising a hammering mechanism and including a tool holder as described above, which tool holder may be mounted on the impacting machine so that a tool mounted within the tool holder receives repeated impacts from the hammering mechanism when the impacting machine is operated.

BRIEF DESCRIPTION OF THE DRAWINGS

Embodiments of a hand supported impact machine having a tool holder according to the present invention will now be described by way of example, with reference to the accompanying drawings in which.

DETAILED DESCRIPTION OF THE INVENTION

Figure 1:
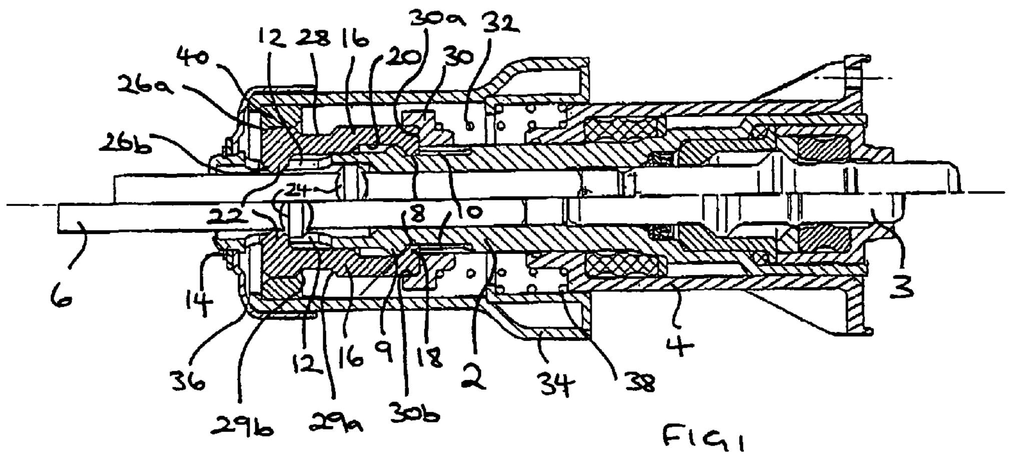
FIG. 1 shows a longitudinal cross-section of a first embodiment of tool holder according to the present invention in the locked position with a tool formed with a collar locked within it.
Figure 2A:
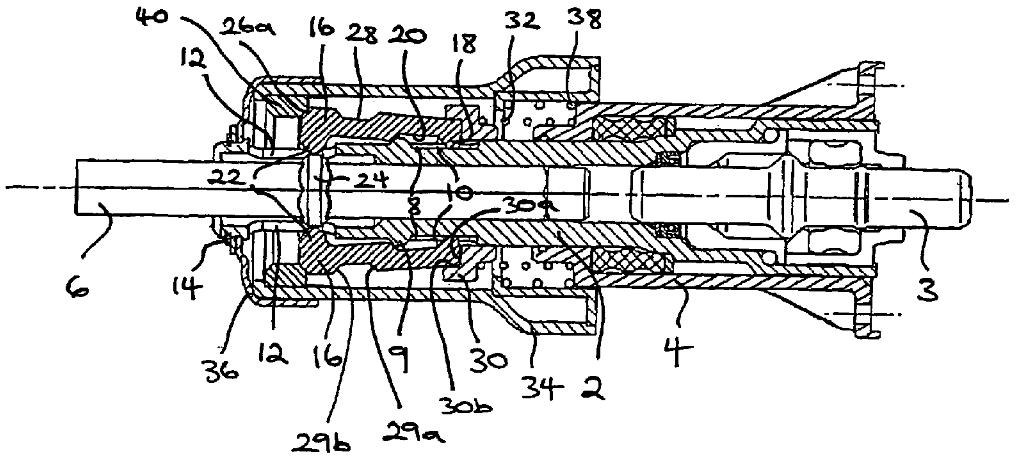
FIG. 2*a* shows a longitudinal cross-section of the tool holder of FIG. 1 in a first unlocked position.
Figure 2B:
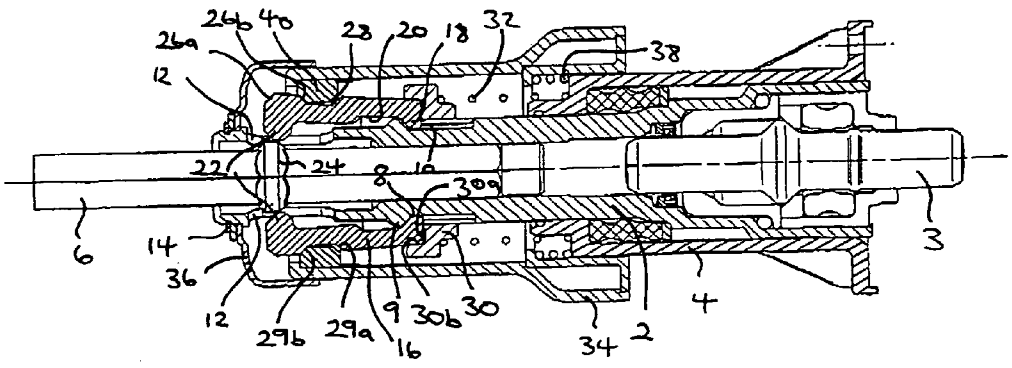
FIG. 2*b* shows a longitudinal cross-section of the tool holder of FIG. 1 in a second unlocked position.

The first embodiment of tool holder, shown in FIGS. 1, 2 and 2*a* has a main body (2) formed as a tube. The rearward end of the main body is mounted within a tubular flange body (4). A shank of a tool (6) locked in the tool holder. The flange body (4) is rigidly fixed to the housing of the impacting machine in a position such that the rearward end of the tool (6) locked within the tool holder is repeatedly impacted by a beatpiece (3) of the hammering mechanism of the impacting machine. In the upper half of FIG. 1 the tool (6) and the beatpiece (3) are shown in their operating position and in the lower half of FIG. 1 the tool (6) and the beatpiece (3) are shown in their idle mode position. The main body (2) is formed with an annular recess (8) and an annular rib (9) in its outer surface, with the annular rib located directly in front of the annular recess. The main body is also formed with a pair axially rearwardly extending slots (10) which extend from the annular recess (8) on opposing sides of the main body (2). The slots (10) are closed at their rearward end and are open into the annular recess (8) at their forward end. In addition the main body is formed with a pair of axially extended through holes (12) on opposing sides of the main body (2) which are aligned with the slots (10). The main body (2) is also formed with an additional annular recess at its forward end for receiving a circlip (14).

The main body has an internal transverse cross-section, rearwardly of the through holes (12) which is hexagonal so that the hexagonal shank of the tool (6) is non-rotatably received within the main body (2). The forward end of the tool will be formed, for example as a chiselling tool, of a type which is well known in the art.

A pair of locking elements or bodies (16) are pivotally and slideably mounted on the main body (2). Each locking body (16) is axially extended with inner and outer surfaces which are curved in the circumferential direction to form part of the surface of a cylinder. At the rearward end of each locking body (16), on the radially inwardly facing surface of the locking body is formed a circumferentially extending rib (18) which is received within the annular recess (8) in the main body (2). The circumferential width of the rearward portion of each locking body (16) corresponds to the circumferential width of a respective slot (10) in the main body, so that the rearward end of the locking body (16) fits within the forward portion of the corresponding slot (10) adjacent the annular recess (8). This circumferentially fixes the locking bodies, with respect to the main body (2), in the slots (10) and enables each locking body to slide rearwardly along the corresponding slot (10) with the rib (18) leaving the annular recess (8) to move along the slot.

Each locking body is formed with a internal recess (20) which enables the locking bodies to slide rearwardly to a limited extent over the rib (9) formed on the main body (2). An engaging portion of each locking body forward of the reduced internal diameter recess (20) is receivable within the corresponding through hole (12) and has a radially inwardly extending abutment (22) which is engageable with the collar (24) formed on the tool (6). The radially inwardly and outwardly facing surfaces of each locking body (16) are formed at their forward ends with sloping surface (26*a*, 26*b*). The radially outwardly facing surface of each locking body (16) is also formed with a circumferentially extending reduced external diameter recess (28) between the abutment (22) and the internal recess (20). The recess (28) has sloping forward and rearward edges (29*a, b*).

The locking bodies are maintained in their position shown in FIGS. 1 and 2 by a retaining sleeve (30) and an actuating sleeve (34) which are mounted around the main body (2). The retaining sleeve (30) is formed with a forward facing annular recess, the base (30*a*) of which abuts the rearward end of the locking bodies and the radially inwardly facing face (30*b*) of which fits around the radially outer facing surface of the locking bodies towards their rearward ends. The retaining sleeve (30) is axially forwardly biased on the main body into engagement with the rearward ends of the locking bodies by a first strong spring (32). The strong spring (32) extends between a forward facing face of the flange body (4) and a rearward facing shoulder of the retaining sleeve (30).

The actuating sleeve (34) is axially slideably supported on the main body (2), at its rearward end by the flange body (4) and at its forward end within a nose ring (36). The nose ring (36) is maintained on the main body (2) by the circlip (14). The actuating sleeve (34) is axially forwardly biased by a second spring (38) with a greater diameter than the first spring. The second spring (38) is mounted around the main body (2) and extends from the forward facing face of the flange body (4) to a rearward facing shoulder formed on the actuating sleeve (34). A lock ring (40) is mounted within the forward end of the actuating sleeve, which lock ring is engageable with the radially outer surface of each locking body. In the locked position of the tool holder in FIG. 1 the locking ring (40) engages the portion of the locking body forward of the recess (28) to maintain the forward ends of the locking bodies in a radially inward position in which the abutments (22) of the locking bodies are engageable with the collar (24) formed on the tool (6).

The tool holder of FIGS. 1 and 2 operates as follows.

To lock a tool (6) within the tool holder, the tool (6) is simply inserted into the forward end of the main body (2). The sloping rearward facing face of the collar (24) formed on the tool, engages the forward facing edge of each locking body (16) and further insertion of the tool (6) causes the collar to push the locking bodies (16) reawardly, along the slots (10) against the retaining sleeve (30) and the biasing force of the first spring (32). This enables the locking bodies (16) to move rearwardly of the locking ring (40), thereafter the sloping rearward face of the collar (24) pushes against the forward sloping surface (26*b*) at the forward end of each locking body (16). This causes the forward ends of the locking bodies to pivot outwardly about the ribs (18) at the rearward end of the locking bodies. This pushes the retaining sleeve (30) slightly further rearwardly against the biasing force of the spring (32) to allow for the pivoting movement. Thus the abutments (22) of the locking bodies assume their radially outward position of FIG. 2*a* and the collar (24) can be moved rearwardly past said abutments and the tool can be fully inserted into the main body (2). Once the collar (24) is pushed past the abutments (22) of the locking bodies (16) the biasing force on the retaining sleeve (30), pushes the retaining sleeve forwardly and causes the locking elements (16) to pivot inwardly and slide forwardly once more. The forward sloping face (26*a*) of the locking bodies engage a rearward facing sloping face of the lock ring (40) which engagement guides the locking bodies (16) into their radially inner position of FIG. 1. The tool (6) is locked in the tool holder by the abutments (22) of the locking bodies (16) extending through the through holes (12) in the main body (2) to engage the collar (24) to limit forward axial movement of the collar (24) and so maintain the tool (6) within the tool holder.

In order to remove the tool (6) from the tool holder, the actuating sleeve (34) is moved axially rearwardly against the biasing force of the second spring (38). This moves the locking ring (40) rearwardly into a position radially outwardly of the recesses (28) in the locking bodies, so that the locking bodies (16) are free to pivot radially outwardly. The tool (6) can then be pulled from the tool holder and the forward sloping face of the collar (24) engages a corresponding sloping face at the rearward end of the abutments (22) of the locking bodies to cause the locking bodies to pivot to their radially outward position (shown in FIG. 2*b*). The first spring (32) maintains the retaining sleeve (30) substantially in its forward position, and so the rib (18) on the locking body pivots in the recess (8) in the main body (2). However, the first spring (32) allows slight rearward movement of the retaining sleeve (30) sufficient to enable the locking bodies to pivot to their radially outer position. With the locking bodies (16) in their radially outer position, the collar can pass the forwardly of the abutments (22) and so can be removed from the tool holder. The actuating sleeve (34) is then released by the user and is moved forwardly into its FIG. 1 position due to the biasing force from the second spring (38). The forward facing sloping face of the lock ring (40) engages the sloping face (29*b*) of the locking bodies to once more lock the locking bodies in their radially inner position.

Figure 3:
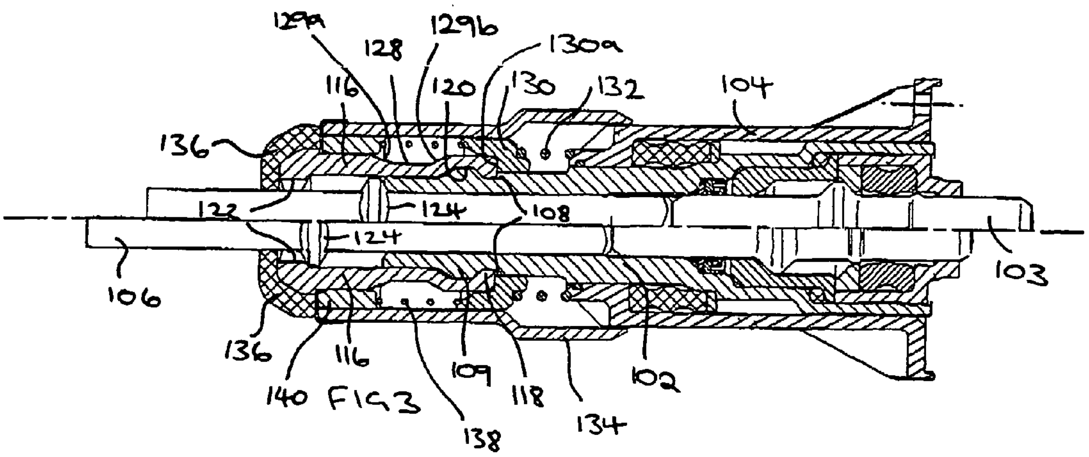
FIG. 3 shows a longitudinal cross-section of a second embodiment of tool holder according to the present invention in the locked position with a tool formed with a collar locked within it.
Figure 4:
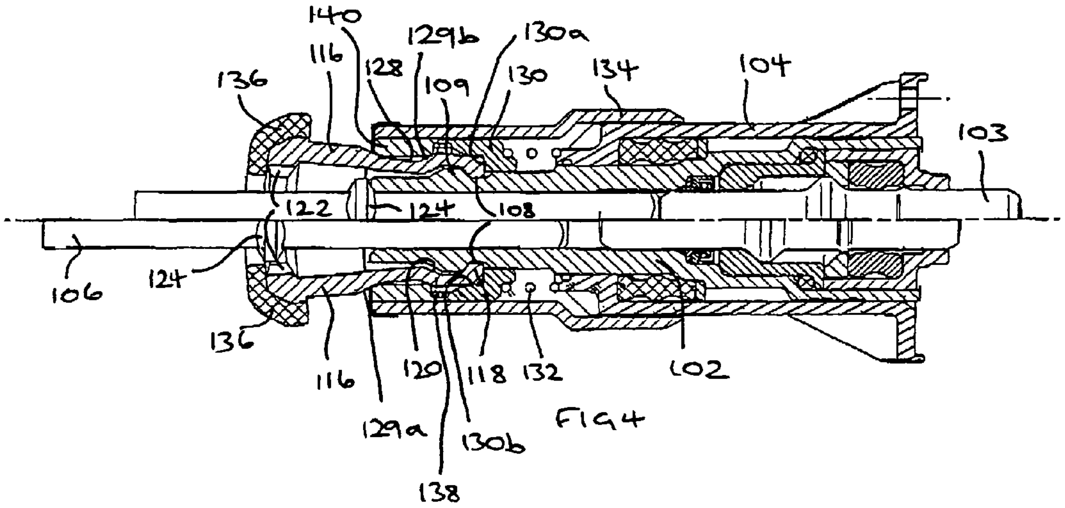
FIG. 4 shows a longitudinal cross-section of the tool holder of FIG. 3 in the unlocked position.

The second embodiment of tool holder, shown in FIGS. 3 and 4 has a main body (102) formed as a tube and mounted within a tubular flange body (104). The flange body (104) is rigidly fixed to the housing of the impacting machine in a position such that the rearward end of the tool (106) locked within the tool holder is repeatedly impacted by a beatpiece (103) of the hammering mechanism of the impacting machine. The top half of FIG. 3 shows the tool (106) and the beatpiece (103) in their operating position and the bottom half of FIG. 3 shows the tool (106) and the beatpiece (103) in their idle mode position. The main body (102) is formed with an annular recess (108) and an annular rib (109) in its outer surface, with the annular rib located directly in front of the annular recess.

The main body (102) has an internal transverse cross-section, which is hexagonal so that the hexagonal shank of the tool (106) is non-rotatably received within the main body.

A pair of locking elements or sleeves (116) are pivotally mounted on the main body (102). The pair of locking sleeves when they come together form a cylindrical sleeve surrounding the forward portion of the main body (2) and extending beyond the forward end of the main body (2). At the rearward end of each locking sleeve (116), on the radially inwardly facing surface of the locking sleeve is formed a circumferentially extending rib (118) which is received within the annular recess (108) in the main body (102).

Each locking sleeve is formed with a internal recess (120) which fits over the rib (109) formed on the main body (102). An engaging portion at the forward end of each locking sleeve is formed with a radially inwardly directed circumferentially extending abutment (122) which is engageable with a collar (124) formed on the tool (106). The radially outwardly facing surface of each locking sleeve (116) is also formed with a circumferentially extending reduced external diameter recess (128) between the abutment (122) and the internal recess (120). The recess (128) has sloping forward and rearward edges (129*a, b*). Around the forward end of each locking sleeve (116) is formed a semi-circular rubber nose ring portion (136). When the locking sleeves come together the two nose ring portions together form a rubber nose ring which surrounds a tool (106) fitted in the tool holder.

The locking bodies are maintained in their position shown in FIG. 3 by a retaining sleeve (130) and an actuating sleeve (134) which are mounted around the main body (102). The retaining sleeve (130) is formed with a forward facing annular recess, the base (130*a*) of which abuts the rearward end of the locking sleeves and the radially inwardly facing face (130*b*) of which fits around the radially outer facing surface of the locking sleeves towards their rearward ends. The retaining sleeve (130) is slideably mounted on the main body (102) and is axially forwardly biased on the main body into engagement with the rearward ends of the locking sleeves by a first strong spring (132). The strong spring (132) extends between a forward facing face of the flange body (104) and a rearward facing external shoulder of the retaining sleeve (130).

The actuating sleeve (134) is axially slideably supported on the main body (102), at its rearward end by the periphery of the flange body (104) and by the retaining sleeve (130). The actuating sleeve (134) is axially forwardly biased by a second spring (138). The second spring (138) is mounted around the main body (102) and extends from a forward facing face of the retaining sleeve (130) to a rearward facing face of a lock ring (140). The lock ring (140) is mounted within the forward end of the actuating sleeve, which lock ring is engageable with the radially outer surface of each locking sleeve (116). In the locked position of the tool holder in FIG. 3 the lock ring (140) engages the portion of the locking sleeves (116) forward of the recess (128) to maintain the forward ends of the locking sleeves in a radially inward position in which the abutments (122) of the locking sleeves are engageable with the collar (124) formed on the on the tool (106). The forward ends of the locking sleeves (116) and the nose ring portions (136) extend forwardly of the main body (102) and forwardly of the actuating sleeve (134).

The tool holder of FIGS. 3 and 4 operates as follows.

To lock a tool (6) within the tool holder, the actuating sleeve (134) is pulled rearwardly against the biasing force of the second spring (138) until the locking ring (140) is positioned radially outwardly of the recess (128) in the locking sleeves (116). With the actuating sleeve (134) in this position, the abutments (122) at the forward ends of the locking sleeves (116) are free to move radially outwardly, as shown in FIG. 4. The tool (106) is then inserted into the forward end of the main body (102). The sloping rearward facing face of the collar (24) formed on the tool, engages a sloping forward facing edge of each nose ring portions (136) and further insertion of the tool (6) causes the collar to push the nose ring portions (136) and thus the abutments (122) of the locking sleeves (116) to pivot outwardly about the ribs (118) at the rearward end of the locking sleeves. This pushes the retaining sleeve (130) slightly rearwardly against the biasing force of the spring (132) to allow for the pivoting movement. Thus, the abutments (122) of the locking sleeves assume their radially outward position of FIG. 4 and the collar (124) can be moved rearwardly past said abutments and the tool can be fully inserted into the main body (102). Once the collar (124) is pushed past the abutments (122) of the locking sleeves (116), the actuating sleeve (134) can be released and the biasing force on the actuating sleeve from the second spring (138), pushes the actuating sleeve forwardly. The forward facing face of the lock ring (140) engages the rearward sloping face (129*a*) of the locking sleeves to urge the locking sleeves (116) into their radially inner position of FIG. 3. The tool (106) is locked in the tool holder by the abutments (122) of the locking sleeves (116) extending radially inwardly in front of the main body (102) so as to engage the collar (124) to limit forward axial movement of the collar (124) and so maintain the tool (106) within the tool holder.

In order to remove the tool (106) from the tool holder, the actuating sleeve (134) is again moved axially rearwardly against the biasing force of the second spring (138). This moves the locking ring (140) rearwardly and radially outwardly of the recesses (128) in the locking sleeves. The tool (106) can then be pulled from the tool holder and the forward sloping face of the collar (124) engages a corresponding sloping face at the rearward end of the abutments (122) of the locking sleeves to cause the locking sleeves to pivot to their radially outward position (shown in FIG. 4). The rib (118) on each locking sleeve pivots in the recess (108) in the main body (102), and the first spring (132) allows slight rearward movement of the retaining sleeve (130) sufficient to enable the locking sleeves to pivot to their radially outer position. With the locking sleeves (116) in their radially outer position, the collar can pass the forwardly of the abutments (122) and so can be removed from the tool holder. The actuating sleeve (134) is then released by the user and is moved forwardly into its FIG. 3 position due to the biasing force from the second spring (138). The forward facing sloping face of the lock ring (140) engages the sloping faces (129*a*) of the locking sleeves to once more move the locking sleeves into their radially inner position.

The third embodiment of tool holder, shown in FIGS. 5 to 7*b* has a main body formed as a tube with a reduced diameter forward guiding portion (202*a*) and an increased diameter rearward portion (202*b*) and is formed at its rearward end with annular flange (204). The flange (204) is rigidly fixed to the housing of the impacting machine in a position such that the rearward end of the tool (206) locked within the tool holder is repeatedly impacted by a beatpiece (203) of the hammering mechanism of the impacting machine. The rearward end or shank of the tool (206) is shown in FIG. 8 with a collar (224) formed on it. An intermediate portion (202*c*) of the main body extending between the increased diameter rearward portion (202*b*) of the main body and the reduced diameter forward portion (202*a*) of the main body is formed with a pair of opposing axially extending through holes (212).

The forward guiding portion (202*a*) of the main body has an internal transverse cross-section which is hexagonal so that the hexagonal shank of the tool (206) is non-rotatably received within the main body (202). The collar (224) has the same hexagonal transverse cross-section as the main portion of the hexagonal shank of the tool (206), and the collar is defined by a reduced diameter portion of the shank of circular transverse cross-section to the front of the collar (224).

A pair of half ring locking elements or bodies (216) are axially and radially slideably mounted within the intermediate portion (202*c*) of the main body. The half ring locking bodies (216) come together to form a ring which surrounds a tool (206) which is locked within the tool holder. Each locking body is formed with a forwardly directed face which slopes forwardly and radially outwardly from the inner periphery of the bodies and with a forwardly directed face (226) which slopes forwardly and radially inwardly from the outer periphery of the bodies. The half rings can be brought into a radially inner position (shown in FIGS. 5 and 7*a*) in which engaging portions or abutments (222) of the locking bodies are engageable with the collar (224) on the tool (206) to lock the tool in the tool holder.

The locking bodies are maintained in their position shown in FIGS. 5 to 7*b* by a retaining ring (230) located within the increased diameter portion (202*b*) of the main body rearwardly of the locking bodies (216) and by an actuating ring (240) located within the intermediate portion (202*c*) of the main body but forwardly of the locking bodies (216). The retaining ring (230) and the actuating ring (240) surround a tool located within the tool holder and have an internal diameter sufficient for the collar (224) on the tool (206) to pass through them. The forward face of the retaining ring (230) abuts the rearward faces of the locking bodies. The retaining ring (230) is slideably located within the increased diameter portion (202*b*) of the main body and is axially forwardly biased within the main body into engagement with the rearward ends of the locking bodies by a first strong spring (232). The strong spring (232) is mounted within the increased diameter portion (202*b*) of the main body so as to engage the rearward face of the retaining ring (230) to urge it forwardly.

An actuating sleeve (234) is axially slideably supported on the main body (202), at its rearward end on the increased diameter portion (202*b*) of the main body and at its forward end on the reduced diameter guiding portion (202*a*) of the main body. The actuating sleeve (234) is axially forwardly biased by a second spring (238) with a greater diameter than the first spring (232). The second spring (238) is mounted around the reduced diameter portion (202*a*) of the main body and extends from a forward facing face of the intermediate portion (202*c*) of the main body to a rearward facing internal shoulder formed on the actuating sleeve (234). The actuating sleeve (234) is formed with a pair of opposing radially inwardly directed fins (235) each of which slide within a corresponding through hole (212) in the main body so as to be engageable with the forward facing face of the actuating ring (240).

The internal surface of the intermediate portion (202*c*) of the main body is formed with three distinct portions. A rearward portion (250) of largest internal diameter within which the retaining ring (230) is an axially slideable fit. A forward portion (254) of smallest diameter within which the actuating ring (240) is an axially slideable fit, and a sloping portion (252) which slopes radially between the rearward and forward portions. When the half ring locking bodies are urged by the retaining ring (230) into the forward part of the sloping portion (252) of smaller internal diameter, as shown in FIG. 5, the locking bodies are brought together and maintained in a radially inward position in which the radially inner portions of the locking bodies (216) are engageable with the collar (24) formed on the on the tool (6), as shown in FIG. 7.

The tool holder of FIGS. 5 to 7 operates as follows.

To lock a tool (206) within the tool holder, the tool (206) is simply inserted into the forward portion (202*b*) of the main body. The collar (224) passes through the actuating ring (240) and the sloping rearward facing face of the collar (224) formed on the tool, engages the forward sloping face of the radially inner part of each locking body (16). Further insertion of the tool (206) causes the collar to push the locking bodies (216) and the retaining ring (230) reawardly, against the biasing force of the first spring (232). This enables the locking bodies (216) to move rearward within the sloping portion (252) to a part of the sloping portion with an increased internal diameter so that the locking bodies (216) are free to move radially outwardly. The sloping rearward face of the collar (224) pushes against the locking bodies (216) to move them radially outwardly so that the locking bodies assume their radially outward position, as shown in FIG. 7*b*. The collar (224) can be moved rearwardly past said locking bodies (216) and the tool can be fully inserted into the main body of the tool holder. Once the collar (224) is pushed past the locking bodies (216) the biasing force on the retaining ring (230), pushes the retaining ring forwardly and causes the locking elements (216) to slide forwardly in the sloping portion (252) which pushes the locking bodies together into their radially inner position. The tool (206) is locked in the tool holder by the locking bodies (216) which are engageable with the collar (224) to limit forward axial movement of the collar (224) and so maintain the tool (206) within the tool holder.

Figures 5, 6, 7A, 7B:
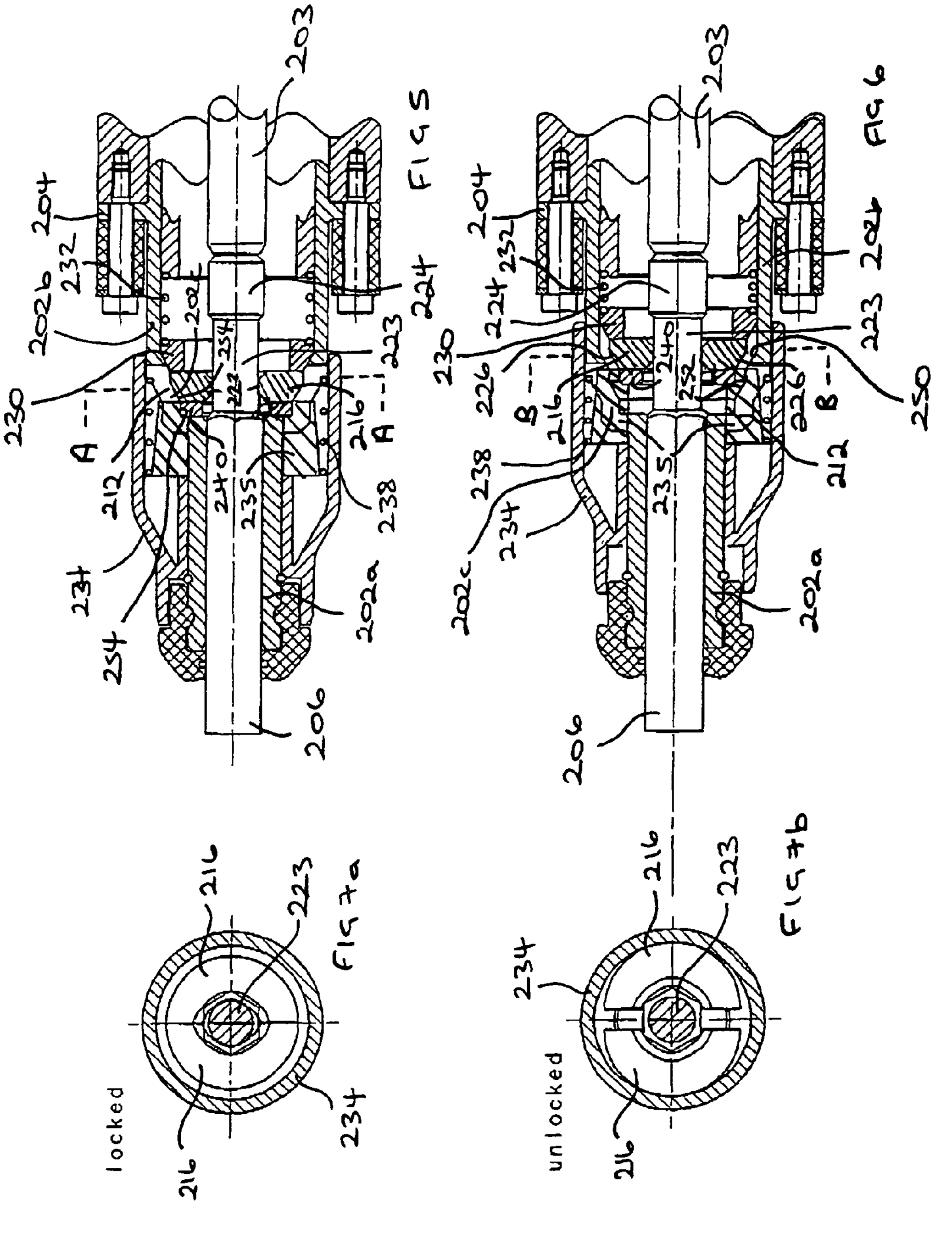
FIG. 5 shows a longitudinal cross-section of a third embodiment of tool holder according to the present invention with a tool formed with a collar locked within it.
FIG. 6 shows a longitudinal cross-section of the tool holder of FIG. 5 with the manually actuable sleeve of the tool holder in an unlocked position
FIG. 7*a* shows a transverse cross-section through line AA of FIG. 5.
FIG. 7*b* shows a transverse cross-section through line BB of FIG. 6, but with the locking elements moved to their unlocked positions.

In order to remove the tool (206) from the tool holder, the actuating sleeve (234) is moved axially rearwardly against the biasing force of the second spring (238) into the position shown in FIG. 6. This causes the fins (235) on the actuating sleeve (234) to engage the actuating ring (240) and move it rearwardly against the biasing force of the retaining ring (230). This moves the locking bodies (216) rearwardly within the sloping portion (252) to the position shown in FIG. 6, and so the locking bodies (216) are free to move into their radially outward position. The tool (206) can then be pulled from the tool holder and the forward sloping face of the collar (224) engages the rearward end of the locking bodies to cause the locking bodies move radially outward as shown in FIG. 7*b*. With the locking bodies (216) in their radially outer position, the collar can pass the forwardly of the locking bodies (216) and so can be removed from the tool holder. The actuating sleeve (234) is then released by the user and is moved forwardly due to the biasing force from the second spring (238). The retaining ring (230) moves the locking bodies (216) and the actuating ring (240) forwardly again and the locking bodies move forwardly in the sloping portion (252) of the internal surface of the main body portion (202*b*) and so are pushed radially inwardly by the sloping surface (252) into their radially inward position, as shown in FIG. 5.

The impacting machine on which the above described tool holders are used, my be for example be a concrete or pavement breaker or a heavy duty demolition hammer.

The invention claimed is:

1. A tool holder for a hand supported impacting machine, which tool holder is suitable for receiving a tool having a shank portion on which is formed a retaining collar, the tool holder comprising:

a tubular main body for receiving the tool, the tubular main body defining a forward direction extending toward a forward end where the tool is inserted into or removed from the main body; and an elongated locking element pivotably mounted at a pivot point on an exterior surface of the main body, the locking element including a forward portion including an engaging portion located forward of the pivot point between the pivot point and the forward end of the main body, the engaging portion pivotably moveable between a radially inner locked position, in which the engaging portion is engageable with the retaining collar of the tool, and a radially outer unlocked position, which enables a tool to be inserted into or removed from the main body; and a manually actuable sleeve which is mounted around the main body so as to be moveable between a first position in which the engaging portion of the locking element is held in the locked position and a second position in which the engaging portion of the locking element is moveable to the unlocked position; wherein the manually actuable sleeve is axially slideably mounted along the main body.

2. A tool holder according to claim 1 and further comprising:

a retaining ring axially slideably mounted with respect to the main body; and a spring member that axially biases the retaining ring into engagement with the locking element so as to bias the locking element engaging portion into the locked position.

3. A tool holder according to claim 2 wherein the retaining ring is located rearwardly of the locking element and the spring member axially biases the retaining ring in the forward direction.

4. A tool holder according to claim 2 wherein the axial movement of the retaining ring is independent of the movement of the manually actuable sleeve.

5. A tool holder according to claim 2 wherein the locking element includes a first end and is pivotally mounted on the main body about the first end so that the engaging portion is radially movable with respect to the main body between the locked position and the unlocked position, and the retaining ring defines a recess, and the first end of the locking element is receivable in the recess so as to guide the pivoting of the locking element.

6. A tool holder according to claim 1 and further comprising a spring member that biases the manually actuable sleeve into the first position.

7. A tool holder according to claim 1 and further comprising a second locking element.

8. A tool holder according to claim 7 wherein the locking element and the second locking element are pivotally mounted on the main body and, when the engaging portions are in the locked position, the locking element and second locking element together form a sleeve which surrounds the tool inserted within the main body.

9. A tool holder according to claim 8 wherein the locking element and second locking element both include a resilient ring portion mounted at a end of each locking element, and in the locked position of the engaging portions of the locking elements the ring portions together form a resilient nose ring.

10. A tool holder according to claim 1 wherein the main body defines a recess and the locking element includes a rearward portion bearing a radially inwardly projecting portion engageable with the recess on the main body so as to facilitate pivoting of the locking element.

11. A tool holder according to claim 1 wherein the main body includes a radially outward projection and the locking element includes a radially inwardly facing recess, and the locking element recess is engageable with the projection on the main body so as to facilitate pivoting of the locking element.

12. A tool holder according to claim 1 wherein the locking element includes a radially outward portion and the manually actuable sleeve includes a radially inward locking member and when the manually actuable sleeve is in the first position then the locking member is engageable with the radially outward portion of the locking element to hold the engaging portion of the locking element in the locked position.

13. A tool holder according to claim 12 wherein the locking element includes a reduced external diameter portion and when the manually actuable sleeve is in the second position then the locking member is located radially outward of the reduced external diameter portion of the locking element.

14. A tool holder according to claim 12 wherein when the manually actuable sleeve is in the second position, then the locking member is located one of axially forward and axially rearward of the locking element.

15. A tool holder according to claim 1 wherein a forward end of the locking element extends forwardly of the forward end of the main body.

16. A tool holder according to claim 15 wherein the locking element includes a rearward portion and a forward portion, the rearward portion is pivotally mounted on the main body and the engaging portion is located on the forward portion.

17. A tool holder according to claim 1 wherein the main body defines a radial through hole, and the locking element has a radially inwardly extending engaging portion extendable through the through hole.

18. A tool holder according to claim 17 wherein the through hole is axially longer than the engaging portion of the locking element.

19. A tool holder according to claim 17 and further comprising:

a retaining ring axially slideably mounted around the main body rearward of the locking element;

a spring member for forwardly biasing the retaining ring into engagement with the locking element; and wherein the locking element is axially slideably mounted on the main body.

20. A tool holder according to claim 19 wherein the manually actuable sleeve member includes a locking member located within the manually actuable sleeve and in the locked position of the sleeve the locking member engages a radially outward portion of the locking element to hold the engaging portion of the locking element in the locked position, and wherein the retaining collar of a tool inserted into the main body is engageable with the locking element so as to push the locking element to a rearward position against the force exerted by the forward biased retaining ring.

21. A tool holder according to claim 20 wherein the rearward position of the locking element is rearward of the locking member, and in the rearward position of the locking element the engaging portion of the locking element is moveable to the unlocked position.

22. A tool holder according to claim 19 wherein the main body includes an outer surface and the outer surface defines a recess and a slot extending axially rearwardly from the recess, and wherein the locking element is axially slideably guided in the slot and pivotable in the recess.

23. A hand supported impacting machine comprising a hammering mechanism and a tool, the tool holder is suitable for receiving a tool having a shank portion including a retaining collar, and wherein the tool holder comprises:

a tubular main body for receiving the tool, the tubular main body defining a forward direction extending toward a forward end where the tool is inserted into or removed from the main body;

an elongated locking element pivotably mounted at a pivot point on an exterior surface of the main body, the locking element including a forward portion including an engaging portion located forward of the pivot point between the pivot point and the forward end of the main body, the engaging portion pivotably moveable between a radially inner locked position, in which the engaging portion is engageable with the retaining collar of the tool, and a radially outer unlocked position, which enables a tool to be inserted into or removed from the main body; and a manually actuable sleeve which is mounted around the main body so as to be moveable between a first position, in which the engaging portion of the locking element is held in the locked position, and a second position, in which the engaging portion of the locking element is moveable to the unlocked position; wherein the manually actuable sleeve is axially slideably mounted along the main body.

* * * * *